US00RE43919E

(19) United States
(12) Reissued Patent
Chen

(10) Patent Number: US RE43,919 E
(45) Date of Reissued Patent: Jan. 15, 2013

(54) BABY CRIB

(75) Inventor: Shun-Min Chen, Taipei (TW)

(73) Assignee: Wonderland Nurserygoods Co., Limited (TW)

(21) Appl. No.: 11/588,412

(22) Filed: Oct. 26, 2006

Related U.S. Patent Documents

Reissue of:
(64) Patent No.: 6,859,957
Issued: Mar. 1, 2005
Appl. No.: 10/829,027
Filed: Apr. 20, 2004

(30) Foreign Application Priority Data

Jan. 2, 2004 (CN) ..... 2004 2 00018045

(51) Int. Cl.
*A47D 13/06* (2006.01)

(52) U.S. Cl. ..... 5/93.1; 5/98.1

(58) Field of Classification Search ..... 5/93.1, 5/98.1, 99.1, 655; 297/440.11
See application file for complete search history.

(56) References Cited

U.S. PATENT DOCUMENTS

| | | | | |
|---|---|---|---|---|
| 1,105,156 | A | 7/1914 | Oliphant | |
| 1,246,544 | A * | 11/1917 | Chassaing | 5/187 |
| 1,374,333 | A | 4/1921 | Stotler et al. | |
| 2,493,181 | A | 1/1950 | Andersen, Jr. | |
| 2,590,315 | A | 3/1952 | Hawley, Jr. | |
| 2,761,153 | A * | 9/1956 | Mew | 5/197 |
| 2,784,420 | A | 3/1957 | Moltane | |
| 2,790,978 | A | 5/1957 | Tigrett | |
| 2,899,693 | A * | 8/1959 | Stollenwerk | 5/627 |
| 2,914,111 | A * | 11/1959 | Mize | 297/45 |
| 3,041,109 | A * | 6/1962 | Eames et al. | 297/451.4 |
| 3,173,155 | A | 3/1965 | Schweikert | |
| 3,601,446 | A * | 8/1971 | Persson et al. | 297/405 |
| 3,640,576 | A * | 2/1972 | Morrison et al. | 297/440.11 |
| 3,658,025 | A | 4/1972 | Hood et al. | |
| 3,677,601 | A * | 7/1972 | Morrison et al. | 297/440.11 |
| 3,784,251 | A * | 1/1974 | Persson et al. | 297/248 |
| 4,018,260 | A | 4/1977 | Baslow | |
| 4,105,244 | A * | 8/1978 | Colby | 297/45 |
| 4,202,065 | A | 5/1980 | Sullivan | |
| 4,538,309 | A | 9/1985 | Gunter | |
| 4,750,223 | A | 6/1988 | D'Arcy et al. | |
| 4,811,437 | A | 3/1989 | Dillner et al. | |
| 4,848,843 | A * | 7/1989 | Gibbs | 297/440.22 |
| 4,899,496 | A | 2/1990 | Chew, II | |
| 4,921,369 | A | 5/1990 | Chew, II et al. | |
| 5,318,348 | A * | 6/1994 | Hess | 297/440.11 |

(Continued)

FOREIGN PATENT DOCUMENTS

CN 2159708 Y 3/1994

(Continued)

*Primary Examiner* — Robert G Santos
(74) *Attorney, Agent, or Firm* — Baker & McKenzie LLP; David I. Roche

(57) ABSTRACT

A baby crib includes a bed frame structure, a fabric member mounted on the bed frame structure to define a surrounding wall around the bed frame structure, and a plurality of positioning posts mounted on the fabric member. The bed frame structure includes a plurality of upright tubes, each of which has a tube wall defining a receiving hole and having a slit that extends along the length of the tube wall and that is in spatial communication with the receiving hole. The positioning posts are inserted respectively into the receiving holes in the upright tubes. The fabric member is clamped between each upright tube and a corresponding positioning post, and extends outward through the slit in each upright tube.

29 Claims, 5 Drawing Sheets

(Amended)

U.S. PATENT DOCUMENTS

| | | | | |
|---|---|---|---|---|
| 5,396,669 | A * | 3/1995 | Nieminen | 5/83.1 |
| 5,507,563 | A * | 4/1996 | Arthur, Jr. | 297/440.23 |
| 5,544,864 | A | 8/1996 | Gabriel-Lacki et al. | |
| 5,716,101 | A * | 2/1998 | Frinier et al. | 297/440.22 |
| 5,762,403 | A * | 6/1998 | Robinson | 297/440.11 |
| 5,778,465 | A | 7/1998 | Myers | |
| 5,867,850 | A | 2/1999 | Mariol | |
| 5,911,478 | A * | 6/1999 | Goodman | 297/440.11 |
| 5,992,348 | A * | 11/1999 | Harding | 119/28.5 |
| 6,098,217 | A | 8/2000 | Hammil | |
| D432,339 | S | 10/2000 | Cromer, III | |
| 6,158,067 | A | 12/2000 | Cheng | |
| 6,192,535 | B1 | 2/2001 | Warner, Jr. et al. | |
| 6,293,624 | B1 * | 9/2001 | Gaylord et al. | 297/440.11 |
| 6,370,714 | B1 * | 4/2002 | Elzenbeck | 5/110 |
| 6,402,116 | B1 | 6/2002 | Northup | |
| 6,511,562 | B1 * | 1/2003 | Coffield | 156/66 |
| 6,539,563 | B1 | 4/2003 | Hsia | |
| 6,560,827 | B1 * | 5/2003 | Gross | 24/265 C |
| 6,585,323 | B2 * | 7/2003 | Gaylord et al. | 297/440.11 |
| 6,623,079 | B2 * | 9/2003 | Gregory | 297/440.11 |
| 6,665,895 | B1 | 12/2003 | St. Pierre et al. | |
| 6,779,849 | B1 * | 8/2004 | Harper et al. | 297/452.13 |
| 7,125,081 | B2 * | 10/2006 | Church et al. | 297/440.11 |
| 7,526,821 | B2 * | 5/2009 | Chen et al. | 5/98.1 |
| 7,568,242 | B2 * | 8/2009 | Troutman | 5/99.1 |
| 7,752,688 | B2 * | 7/2010 | Chen et al. | 5/93.1 |
| 2002/0166170 | A1 | 11/2002 | Hartenstine et al. | |
| 2003/0177574 | A1 | 9/2003 | Waldman | |
| 2005/0120522 | A1 * | 6/2005 | Church et al. | 24/265 R |
| 2006/0185082 | A1 * | 8/2006 | Casati Troutman | 5/99.1 |
| 2006/0225207 | A1 * | 10/2006 | Johnson | 5/98.1 |
| 2006/0230528 | A1 * | 10/2006 | Church | 5/98.1 |
| 2008/0115269 | A1 * | 5/2008 | Chen et al. | 5/99.1 |
| 2010/0132115 | A1 * | 6/2010 | Hsu | 5/98.1 |
| 2010/0270843 | A1 * | 10/2010 | Wang | 297/440.11 |
| 2011/0233984 | A1 * | 9/2011 | Lee | 297/440.11 |

FOREIGN PATENT DOCUMENTS

| | | | |
|---|---|---|---|
| CN | 2166699 | A1 | 6/1994 |
| CN | 2166699 | Y | 6/1994 |
| CN | 2236272 | A1 | 10/1996 |
| CN | 2236272 | Y | 10/1996 |
| CN | 2289466 | A1 | 9/1998 |
| CN | 2289466 | Y | 9/1998 |
| CN | 1281670 | | 1/2001 |
| CN | 1281670 | A | 1/2001 |
| CN | 1383774 | A | 12/2002 |
| CN | 1383774 | A1 | 12/2002 |
| GB | 1360375 | * | 7/1974 |
| GB | 2284988 | | 6/1995 |
| GB | 2408201 | | 5/2005 |

* cited by examiner

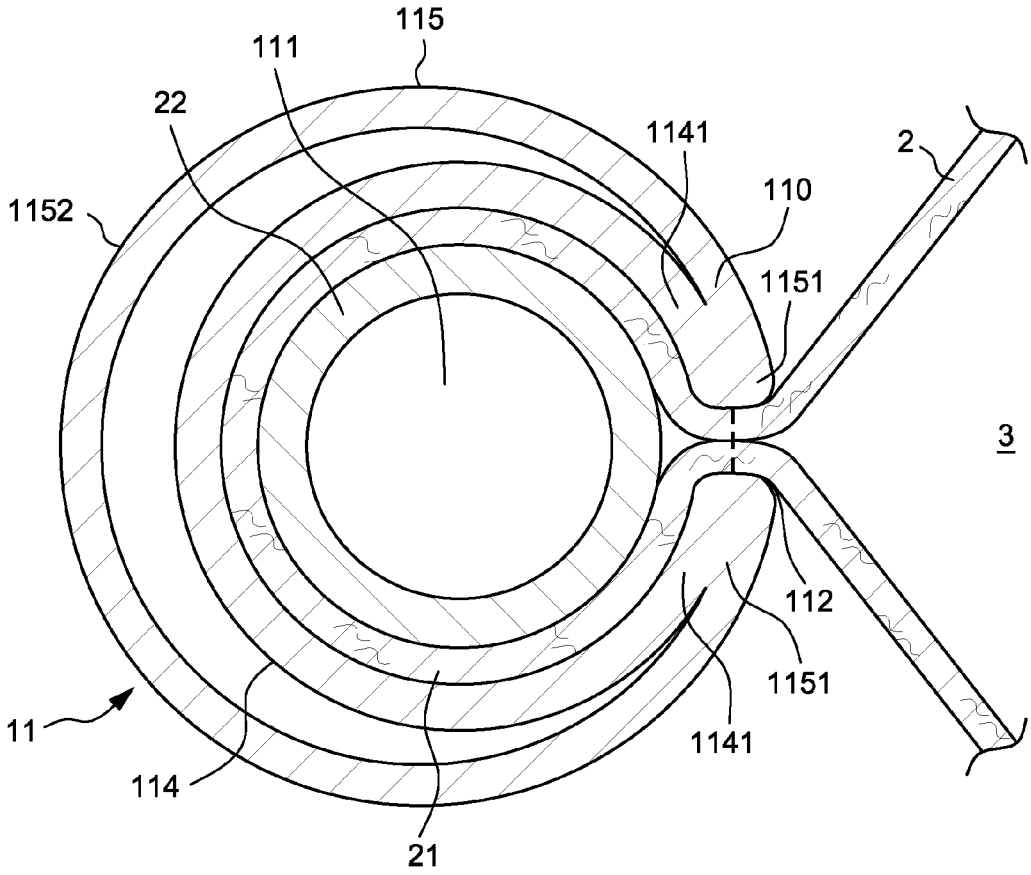
FIG. 5 (Amended)

BABY CRIB

Matter enclosed in heavy brackets [ ] appears in the original patent but forms no part of this reissue specification; matter printed in italics indicates the additions made by reissue.

CROSS-REFERENCE TO RELATED APPLICATION

This application claims priority of Chinese Application No. 2004200018045, filed on Jan. 2, 2004.

BACKGROUND OF THE INVENTION

1. Field of the Invention

The invention relates to a baby crib, more particularly to a baby crib that can be assembled with ease.

2. Description of the Related Art

Referring to FIGS. 1 and 2, a currently available baby crib is shown to comprise a bed frame structure 8 and an enclosure member 9 mounted on the bed frame structure 8 so as to define a receiving space for a baby to sleep or play.

The bed frame structure 8 usually has an upright tube 81 disposed at each corner of the crib. The enclosure member 9 is sleeved on the four upright tubes 81 of the bed frame structure 8, and is stretched tightly thereby. A screw 82 is passed through a packing plate 83 and the enclosure member 9, and engages a bottom end portion of the corresponding upright tube 81 so as to fix the enclosure member 9 on the bed frame structure 8.

However, assembly of the aforesaid baby crib actually consumes a lot of time. Furthermore, since the screw 82 passes through the enclosure member 9 so as to fix the enclosure member 9 on the corresponding upright tube 81 of the bed frame structure 8, a hole is formed in the enclosure member 9 such that when the enclosure member 9 is stretched, the enclosure member 9 is likely to tear at the periphery of the hole. Moreover, the outer appearance of the aforesaid baby crib is adversely affected since the screw 82 is visible from the exterior of the bed frame structure 8.

SUMMARY OF THE INVENTION

Therefore, the object of the present invention is to provide a baby crib that can be easily assembled, that has a fabric member effectively positioned on a bed frame structure, and that has an appealing appearance.

According to this invention, a baby crib comprises a bed frame structure, a fabric member, and a plurality of positioning posts. The bed frame structure includes a plurality of upright tubes, each of which has a tube wall defining a receiving hole and having a slit that extends along the length of the tube wall and that is in spatial communication with the receiving hole. The fabric member is mounted on the bed frame structure to define a surrounding wall around the bed frame structure. The positioning posts are mounted on the fabric member, and are inserted respectively into the receiving holes in the upright tubes. The fabric member is clamped between each of the upright tubes and a corresponding one of the positioning posts, and extends outward through the slit in each of the upright tubes.

BRIEF DESCRIPTION OF THE DRAWINGS

Other features and advantages of the present invention will become apparent in the following detailed description of the preferred embodiment with reference to the accompanying drawings, of which:

FIG. 5 is a sectional view of the preferred embodiment taken along line V-V of FIG. 4.

DETAILED DESCRIPTION OF THE PREFERRED EMBODIMENT

Figure 1:
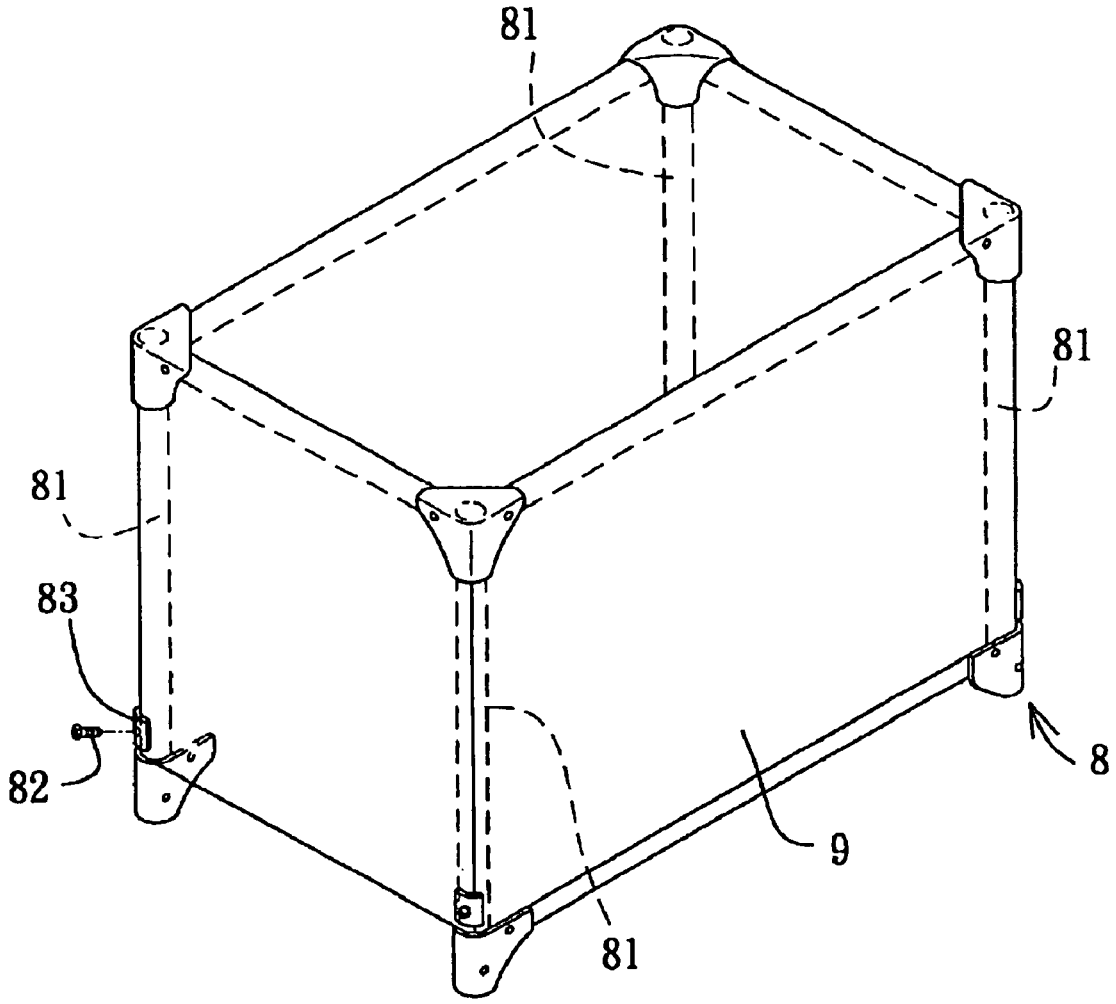
F I G. 1 PRIOR ART
FIG. 1 is a perspective view of a currently available baby crib.
Figure 2:
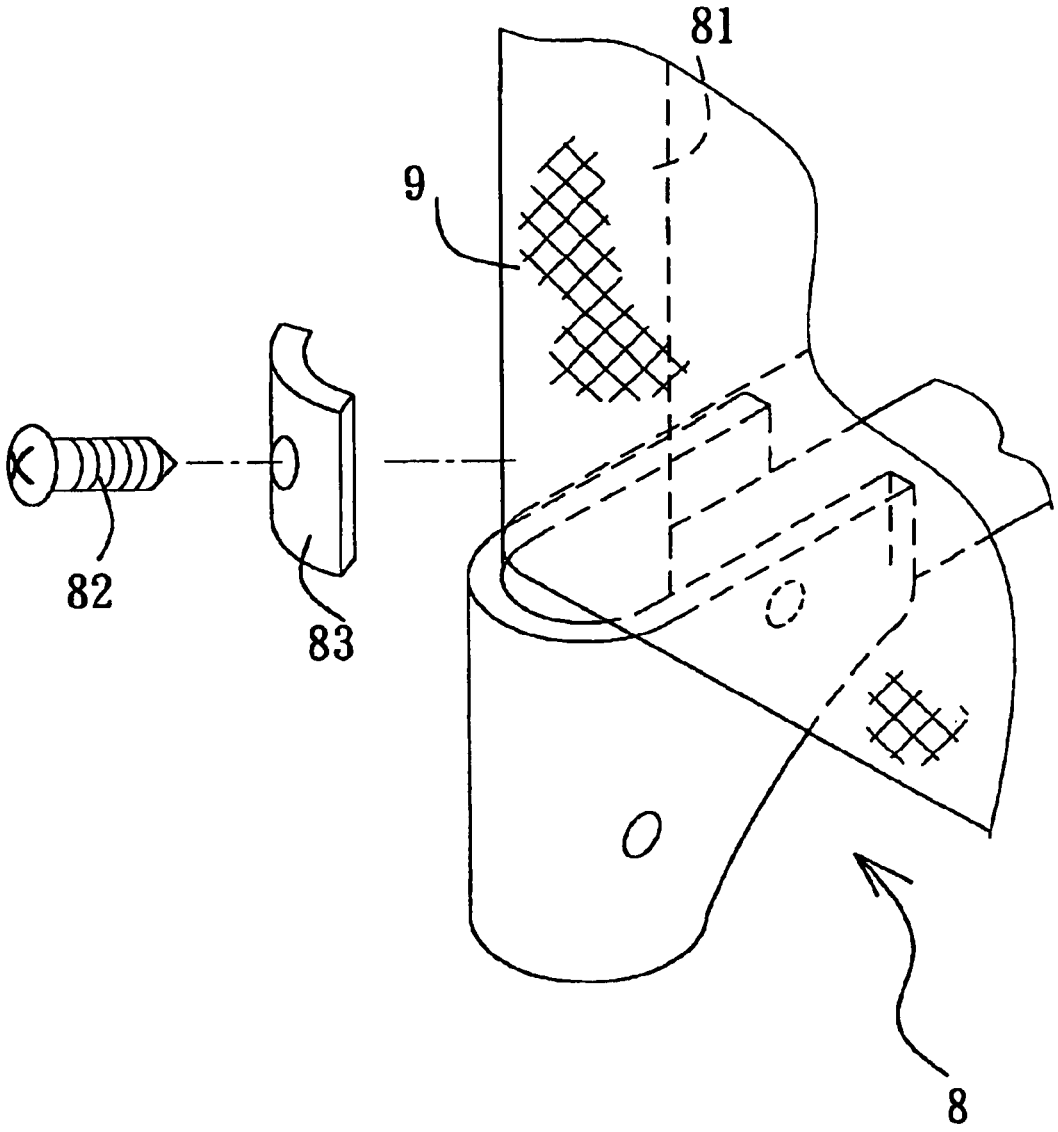
F I G. 2 PRIOR ART
FIG. 2 is an enlarged fragmentary perspective view of FIG. 1, illustrating how an enclosure member is fixed on a bed frame structure by a screw.
Figure 3:
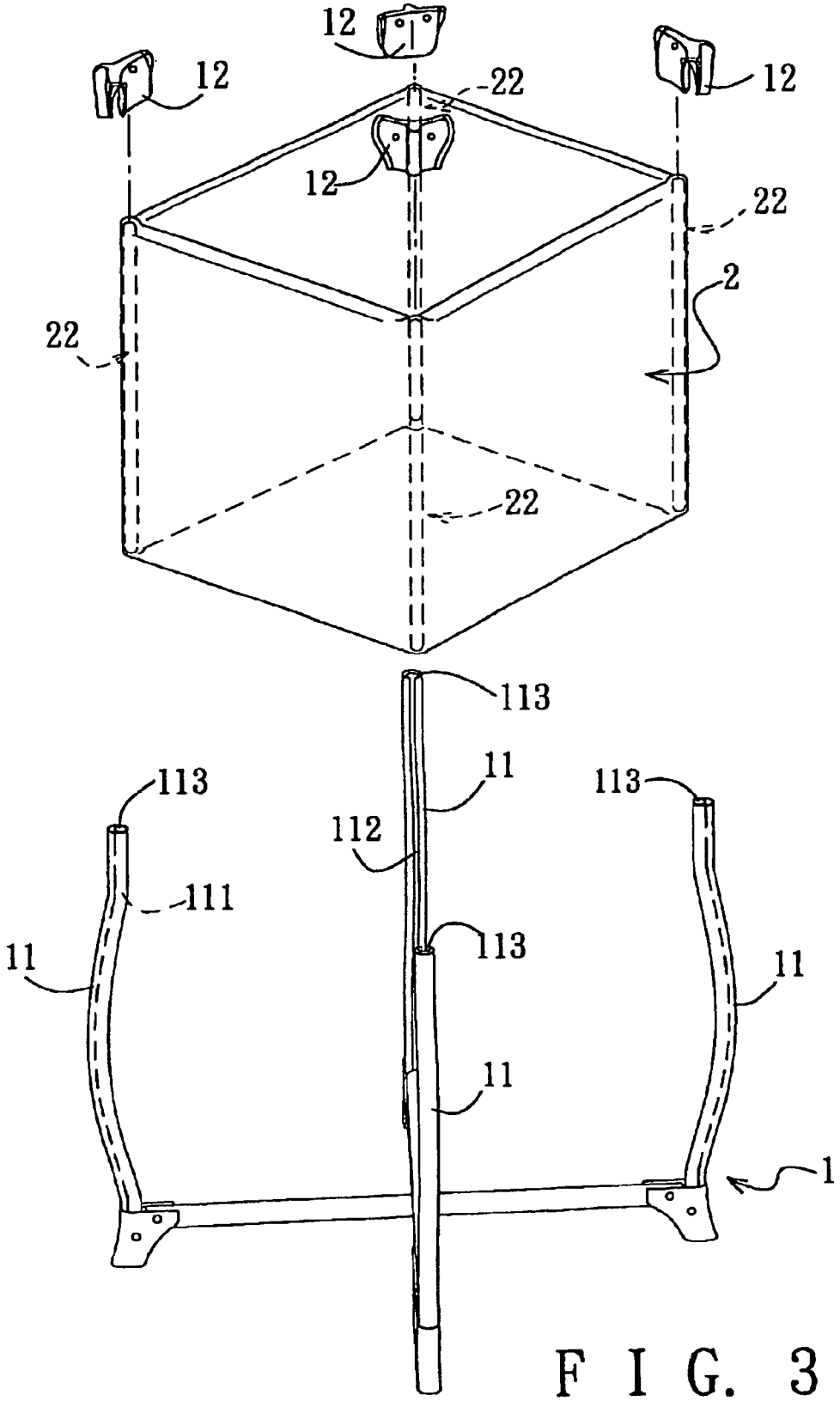
FIG. 3 is an exploded perspective view of the preferred embodiment of a baby crib according to the present invention.
Figure 4:
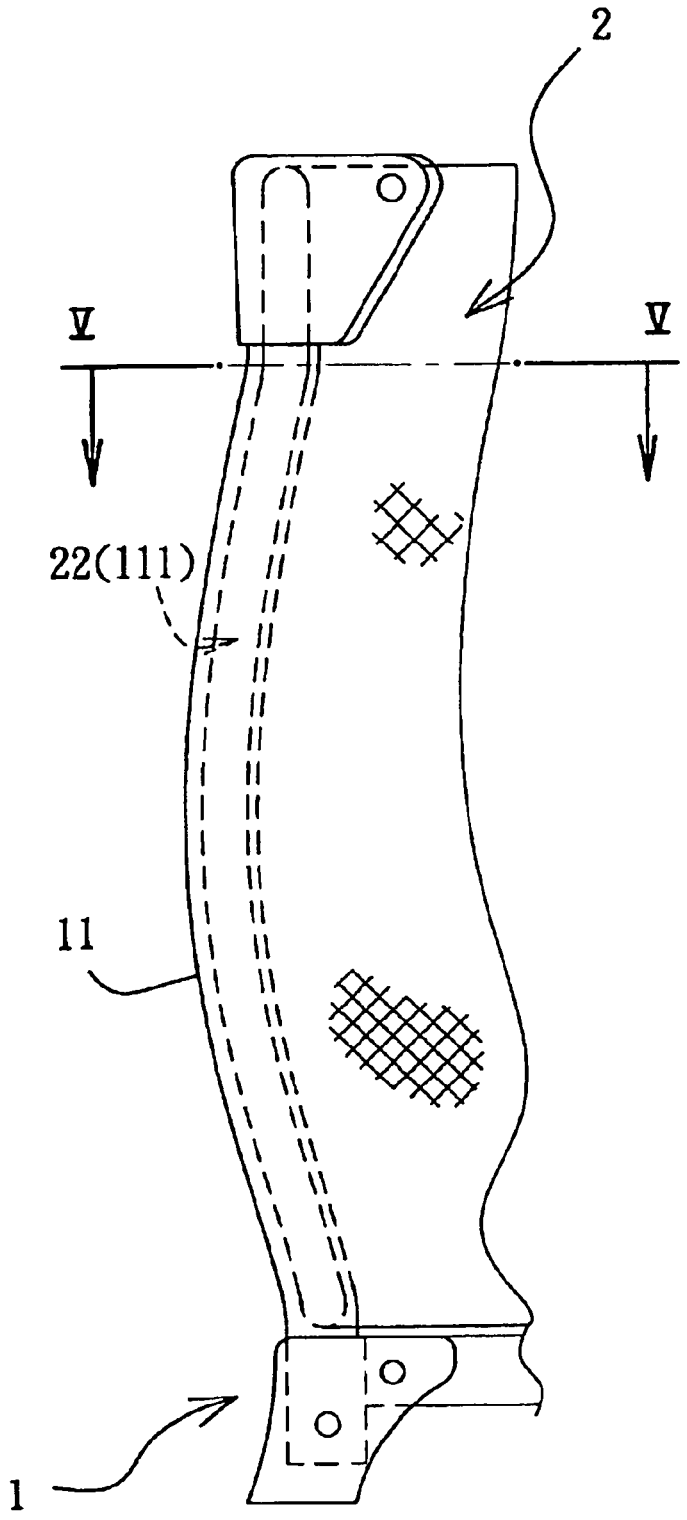
FIG. 4 is a fragmentary schematic view of the preferred embodiment, illustrating how a fabric member is positioned on a bed frame structure.

Referring to FIGS. 3 to 5, the preferred embodiment of a baby crib according to the present invention is shown to comprise a bed frame structure 1, a fabric member 2, and a plurality of positioning posts 22.

The bed frame structure 1 is rectangular, and includes four upright tubes 11 disposed on each corner of the bed frame structure 1. Each of the upright tubes 11 is rigid, and has a tube wall 110 defining a receiving hole 111. To enhance the appearance of the baby crib of the present invention, each upright tube 11 is preferably curved, as best shown in FIG. 3. Each upright tube 11 is formed of extruded aluminum such that an inner portion thereof is formed with the receiving hole ill that extends along the length of the tube wall 110. The tube wall 110 is formed with a slit 112 which extends along the length of the tube wall 110 and which is in spatial communication with the receiving hole 111. Each upright tube 11 further has a top open end 113 that is in spatial communication with the receiving hole 111.

The fabric member 2 is mounted on the bed frame structure 1 so as to define a surrounding wall around the bed frame structure 1, and includes four sleeve portions 21 (only one is shown in FIG. 5) formed by sewing.

In this embodiment, there are four positioning posts 22 mounted on the fabric member 2, and each of the positioning posts 22 is formed as a flexible tube, such as a plastic or metal tube. Each positioning post 22 is enclosed within the respective sleeve portion 21 of the fabric member 2 so that the fabric member 2 is formed with four lateral sides when the latter is mounted on the bed frame structure 1.

During assembly, the fabric member 2 is directly mounted on the bed frame structure 1 by inserting the positioning posts 22 respectively into the receiving holes 111 in the upright tubes 11 through the top open ends 113. As shown in FIG. 5, the tube wall 110 of each upright tube 11 includes a first wall part 114 and a second wall part 115. The first wall part 114 is concentric with a respective one of the positioning posts 22, and has two opposite first ends 1141 on two sides of the slit 112. The second wall part 115 is eccentric relative to the respective one of the positioning posts 22, and extends around the first wall part 114. The second wall part 115 has two opposite second ends 1151 connected integrally to the first ends 1141 of the first wall part 114, and a remaining part 1152 spaced apart from the first wall part 114.

Since the positioning posts 22 are flexible, they can follow the curved configuration of the upright tubes 11 upon insertion into the receiving holes 111, as best shown in FIG. 4. [At this time] *Moreover, as shown in FIG. 5*, the fabric member 2 is clamped between each of the upright tubes 11 and a corresponding one of the positioning posts 22, and extends outward through the slit 112 in each of the upright tubes 11[, as best illustrated in FIG. 5.] *to form an enclosure member*

*having a plurality of side panels that surround an inner enclosed space 3 for receiving a baby. The fabric member 2 can extend outside the upright tube 11 generally in two directions of two other upright tubes 11, and lie substantially out of contact with the outwardly facing surface of the outer tube wall defined by the remaining part 1152 of the second wall part 115. As the outwardly facing surface on each upright tube 11 is exposed outward, an outer contour shape of each upright tube 11 can be substantially visible from the outside of the enclosed space 3.*

Since the fabric member 2 is clamped between each of the upright tubes 11 and a corresponding one of the positioning posts 22, the fabric member 2 can be positioned fixedly on the bed frame structure 1 without the need for screws. As such, not only is the assembly operation of the baby crib of the present invention quick, the outer appearance of the baby crib is enhanced as well since there are no screws visible from the exterior of the bed frame structure 1.

Referring back to FIG. 3, a cap 12 is provided at the top open end 113 of each upright tube 11 after the corresponding positioning post 22 is inserted into the corresponding receiving hole 111 so as to cover the top open end 113, thereby further enhancing the outer appearance of the baby crib of the present invention.

In this embodiment, the aforementioned positioning posts 22 are flexible so as to follow the curved configuration of the upright tubes 11 upon insertion into the latter. However, when the upright tubes 11 are configured as straight posts, the positioning posts 22 need not be made of flexible materials. Instead, the positioning posts 22 can be made of wood. Furthermore, while the sleeve portions 21 are formed on the fabric member 2 by sewing so as to enclose the positioning posts 22 within the disclosed embodiment, alternative methods are available for mounting the positioning posts 22 fixedly to the fabric member 2.

From the aforementioned description of the preferred embodiment of the baby crib of the present invention, it is apparent that through the presence of the receiving holes 111 in the upright tubes 11 of the bed frame structure 1, and through the mounting of the positioning posts 22 on the fabric member 2 prior to insertion into the receiving holes 111, screws are not required to position the fabric member 2 on the bed frame structure 1. As such, assembly and disassembly of the baby crib of the present invention is easy, the fabric member 2 is not easily damaged, and the outer appearance of the baby crib of the present invention is enhanced as well.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A baby crib comprising:

a bed frame structure including a plurality of upright tubes, each of which has [a] *an inner* tube wall, *and an outer tube wall defining an outer contour shape of the upright tube, the inner tube wall* defining a receiving hole, and *the outer tube wall* having *an outwardly facing surface and* a slit that extends along the length of said *outer* tube wall and that is in spatial communication with said receiving hole;

a fabric member mounted on said bed frame structure to define a surrounding wall around said bed frame structure *and delimit an enclosed space adapted to receive a baby*; and a plurality of positioning posts mounted on said fabric member and inserted respectively into said receiving holes in said upright tubes, said fabric member being clamped between each of said upright tubes and a corresponding one of said positioning posts and extending outward through [said slit in each of said upright tubes] *each of said slits in each of said upright tubes, whereby the fabric member extends in directions between the upright tubes substantially out of contact with the outwardly facing surface of the outer tube wall of each of the upright tubes, such that the outwardly facing surface of each of the upright tubes is exposed on an outside of the enclosed space.*

2. The baby crib as claimed in claim 1, wherein said fabric member includes a plurality of sleeve portions, said positioning posts being enclosed respectively in said sleeve portions.

3. The baby crib as claimed in claim 1, wherein each of said positioning posts is formed as a flexible tube.

4. The baby crib as claimed in claim 1, wherein each of said upright tubes is formed with a top open end for insertion of a respective one of said positioning posts.

5. The baby crib as claimed in claim 4, wherein each of said upright tubes further includes a cap to cover said top open end thereof.

6. The baby crib as claimed in claim 1, wherein said tube wall of each of said upright tubes includes a first wall part that is concentric with a respective one of said positioning posts and that has two opposite first ends on two sides of said slit, and a second wall part that is eccentric relative to the respective one of said positioning posts, that extends around said first wall part, and that is connected to said first ends.

7. The baby crib as claimed in claim 6, wherein said second wall part has two opposite second ends connected integrally to said first ends, and a remaining part spaced apart from said first wall part.

*8. A baby crib comprising:*

*a bed frame structure including a plurality of upright tubes, wherein each of the upright tubes, respectively, includes an outer wall and a receiving hole extending along a length of the upright tube, the outer wall having an outwardly facing surface and defining an outer contour shape of the upright tube;*

*an enclosure member surrounding an enclosed space adapted for receiving a baby therein; and*

*a plurality of positioning posts provided on the enclosure member at locations corresponding to the upright tubes, wherein the positioning posts are configured to lodge into the receiving holes of the upright tubes for supporting the enclosure member between the upright tubes, whereby the enclosure member extends from one upright tube generally in directions of other of the upright tubes substantially out of contact with the outwardly facing surfaces of the upright tubes, such that the outwardly facing surface of each of the upright tubes is exposed on an outside of the enclosure member.*

*9. The baby crib according to claim 8, wherein the positioning posts are made of a flexible material.*

*10. The baby crib according to claim 8, wherein the receiving holes open at a top end of the upright tubes for insertion of the positioning posts.*

*11. The baby crib according to claim 10, wherein the top end of the upright tubes further respectively includes a cap for closing each receiving hole.*

*12. The baby crib according to claim 8, wherein the enclosure member includes a plurality of sleeve portions in which the positioning posts are provided.*

*13. The baby crib according to claim 12, wherein the sleeve portions are clamped inside the receiving holes when the positioning posts are inserted in the upright tubes.*

*14. The baby crib according to claim 8, wherein the enclosure member is made of a fabric material.*

*15. A baby crib comprising:*

*a plurality of upright tubes defining corners of the baby crib, wherein each of the upright tubes has an outer wall that defines an outer contour shape of the upright tube; and*

*an enclosure member including a plurality of side panels contiguously connected to one another along edge portions and surrounding an enclosed space adapted for receiving a baby therein; and*

*a plurality of positioning posts provided on the enclosure member at locations corresponding to the edge portions of the enclosure member, wherein the positioning posts are lodged inside the upright tubes, the side panels extending between the upright tubes substantially out of contact with the outside surfaces of outer walls of the upright tubes, such that the outwardly facing surface of each of the upright tubes is exposed on an outside of the enclosure member.*

*16. The baby crib according to claim 15, wherein the edge portions of the enclosure member are provided with positioning posts configured to respectively slide into the upright tubes.*

*17. The baby crib according to claim 16, wherein at least one edge portion of the enclosure member includes a sleeve in which one positioning post is provided.*

*18. The baby crib according to claim 17, wherein the upright tubes open at a top end for insertion of the positioning posts.*

*19. The baby crib according to claim 15, wherein the enclosure member is made of a fabric material.*

*20. A baby crib comprising:*

*a frame structure including a plurality of support tubes, wherein each of the support tubes has an outer wall that defines an outer contour shape of the upright tube;*

*an enclosure member including a plurality of side panels having edge portions; and*

*an attachment structure configured to mount and secure the edge portions of the enclosure member along the support tubes,*

*whereby the side panels surround an enclosed space, and each of the side panels extends generally between two of the support tubes substantially out of contact with outwardly facing surfaces of the outer walls thereof, such that the outwardly facing surface of each of the upright tubes is exposed on an outside of the enclosure member.*

*21. The baby crib according to claim 20, wherein the attachment structure clamps the edge portions of the enclosure member inside the support tubes.*

*22. The baby crib according to claim 20, wherein the attachment structure includes:*

*a first connecting structure provided on at least one edge portion of the enclosure member and having a first surface; and*

*a second connecting structure provided on at least one support tube and having a second surface matching with the first surface;*

*wherein the first and second connecting structures securely mate each other by sliding the first surface along the second surface.*

*23. The baby crib according to claim 22, wherein the first connecting structure includes one positioning post and the second connecting structure includes a receiving hole configured to receive the insertion of the positioning post therein.*

*24. The baby crib according to claim 23, wherein the positioning post is made of a flexible material.*

*25. The baby crib according to claim 23, wherein the positioning post is provided in a sleeve portion formed at the one edge portion.*

*26. The baby crib according to claim 23, wherein the receiving hole opens at a top end of the at least one support tube for insertion of the positioning post.*

*27. The baby crib according to claim 20, wherein the enclosure member is made of a fabric material.*

*28. The baby crib according to claim 20, wherein the upright tubes are curved.*

*29. The baby crib according to claim 15, wherein the upright tubes are curved.*

* * * * *